United States Patent
> Heckmann et al.

[15] 3,685,811

[45] Aug. 22, 1972

[54] GAS-DISPERSING MEANS FOR PLATE COLUMNS

[72] Inventors: Carl-Justus Heckmann, Stieglitzstr. 67; Michael Heckmann, Holbeinstr. 1, both of 7031 Leipzig, Germany

[73] Assignee: Heckmannwerk K G, Leipzig, Germany

[22] Filed: Feb. 18, 1969

[21] Appl. No.: 800,219

[52] U.S. Cl. ........................261/114 R, 261/114 VT
[51] Int. Cl. .............................................B01d 3/16
[58] Field of Search.261/114, 114.1, 114 VT, 114 JP

[56] References Cited

UNITED STATES PATENTS

| | | | |
|---|---|---|---|
| 973,795 | 10/1910 | Lummus | 261/114.1 |
| 2,893,713 | 7/1959 | Haltmeier | 261/114.1 |
| 3,055,646 | 9/1962 | Eld et al. | 261/114 VT |
| 3,143,582 | 8/1964 | Jones et al. | 261/114 VT |
| 3,025,041 | 3/1962 | Sandler | 261/114 VT |

FOREIGN PATENTS OR APPLICATIONS

| | | | |
|---|---|---|---|
| 721,247 | 1/1955 | Great Britain | 261/114.1 |
| 1,286,882 | 11/1962 | France | 261/114 VT |

*Primary Examiner*—Tim R. Miles
*Assistant Examiner*—Steven H. Markowitz
*Attorney*—Hammond & Littell

[57] ABSTRACT

In a plate column including a plurality of spaced horizontal plates provided with downcomers, a plurality of openings in the plates for passage of the vapors upwardly, and short nipples disposed in the openings, the improvement residing in the provision over the nipples of rotatable, vertically movable disks having circumferentially arranged fan elements. The diameter of the disks is such that when insufficient quantity of vapor is generated, the disks descend onto the short nipples to block flow of any vapor therethrough. A fan wheel may be provided below each disk in the vapor space of the lower plate to restrict escape of entrained liquid particles.

3 Claims, 5 Drawing Figures

PATENTED AUG 22 1972 3,685,811

INVENTORS
CARL-JUSTUS HECKMAN
MICHAEL HECKMAN
BY
ATTORNEYS

GAS-DISPERSING MEANS FOR PLATE COLUMNS

PRIOR ART

The known fractionating plate columns which are utilized for liquid-gas contacting may be divided into two classifications:
1. cross-flow plate, and
2. counter-flow plate.

The cross-flow tray requires a liquid downcomer and is more generally used than counter-flow tray because of transfer-efficiency advantages and greater operating range. The flow pattern of the liquid on a cross-flow tray can be controlled by varying the placement of downcomers in order to increase stability of operation or improve mass-transfer efficiency.

Where the liquid loading on a column is less than 60–80 gal./min-ft. of weir, a normal cross-flow pattern with segmental outlet weir is generally used. In the event the liquid loading exceeds 60–80 gal./min.-ft. of weir, in a column having sufficient vapor capacity, split-flow and sometimes radial flow are used.

The fraction of column cross-sectional area available for gas-dispersion components, such as caps or perforations, is significantly lower in split-flow design than in cross-flow design. Thus, for the same vapor capacity, split-flow design generally requires a larger column diameter than normal cross-flow.

Elements used in plate towers for the purpose of gas dispersion are bubble caps, sieve perforations, or modifications thereof.

The tray construction, wherein the liquid is maintained on the tray surface by the kinetic energy of the vapor, is called the sieve tray. The openings in the tray may take the form of circles or slits formed by mechanical punching of the metal tray.

A more effective method of insuring contact between the vapor and the reflux of a fractionating column is the use of bubble caps on the trays. Each plate in the column has a plurality of openings and each of the openings is provided with a short nipple. Each nipple is surmounted with a bell-shaped cap which is secured in place by means of a spider and a bolt. The lower edge of the cap may be serrated or provided with slots. As the vapor rises through a nipple from the plate below, it is diverted downward by the cap and bubbles out under the serrations or through the slots. A layer of liquid is maintained on the plate and the depth of the liquid is such that the caps are submerged. The downpipe from the plate above is sealed by liquid on the plate below, so that vapor cannot enter the downpipe. Ordinarily, the liquid is delivered at one end of the tray by a downpipe from the plate above, flows across the tray, and is discharged by a downpipe onto the lower tray. Baffles can be placed between the caps to divert the liquid and cause uniform flow across the tray.

The shortcomings of the known trays are severalfold: the construction costs are high; there is a considerable loss in pressure as the vapor traverses from the boiler to the top of the column; and the undesirable transfer of entrained liquid particles through the openings in the trays to the liquid on that tray detrimentally interferes with the concentration differential of the liquid and the vapor.

OBJECTS OF THE INVENTION

It is an object of this invention to provide an improved gas-dispersing assembly.

It is another object to provide a simple device which can be manufactured at a reduced cost.

It is another object to provide a device which would reduce the escape of entrained liquid to the upper trays.

It is still another object to provide a gas-dispersing assembly having a greater mass-transfer efficiency between liquid and vapor.

THE INVENTION

The disadvantages and shortcomings of the prior art devices are alleviated by the invention which relates to a gas-dispersing assembly comprising a conduit; a shaft disposed in said conduit; means for freely mounting said shaft within said conduit; and cover means positioned on said shaft for yieldably closing one end of said conduit. More specifically, the invention pertains to an improvement in gas-dispersing components for plate columns. The improvement resides in provision, over a short nipple, of a rotatable, vertically movable disk having circumferentially arranged fan elements. The disk rides up and down on vertically positioned shaft in response to the vapor passing through the nipple. A fan wheel is disposed on the same shaft in the vapor space of the lower plate below the disk for the purpose of reducing the carry-over of entrained liquid from a lower tray to an upper tray in a column.

DESCRIPTION OF THE DRAWINGS

In the appended drawings.

DESCRIPTION OF THE INVENTION

Figure 1:
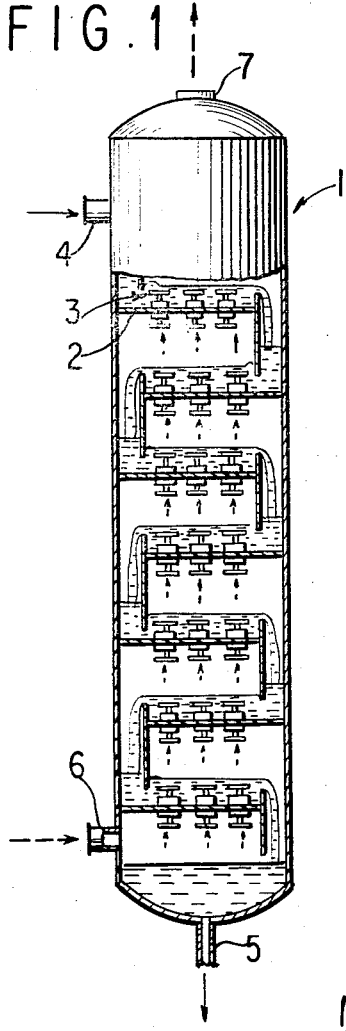
FIG. 1 is a cross-sectional view of a plate column, partially in section.
Figure 2:
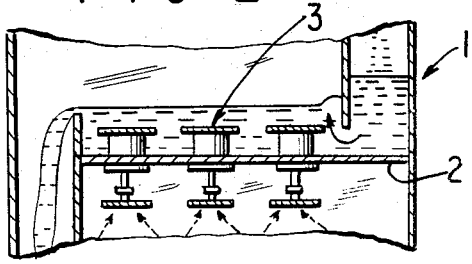
FIG. 2 is a side view of the novel tray.
Figure 3:
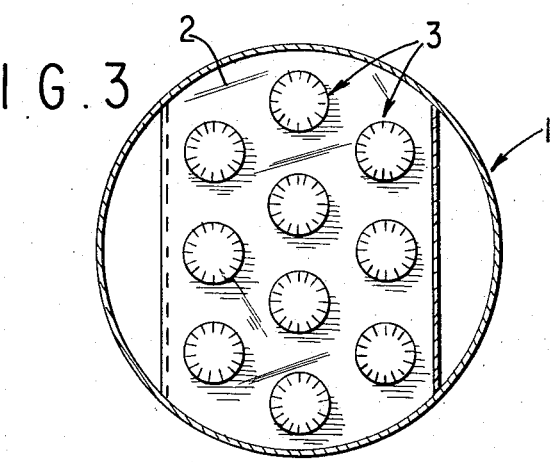
FIG. 3 is a plan view of the novel tray.

Referring to the drawings, a plurality of trays 2 are disposed along the length of distillation or fractionation column 1. These trays are provided with gas-dispersing assemblies 3 which are effective in providing a more efficient contacting of the liquid phase with the vapor phase.

The liquid phase enters column 1 through inlet 4, traverses tray 2 and gas-dispersing assemblies 3 in cross-flow fashion, flows to the next lower tray 2 via downcomer, and so on to the outlet 5. The vapor phase is fed to inlet 6, passes upwardly through the gas-dispersing assemblies 3, thus coming in contact and being dispersed in liquid phase flowing downwardly, and leaves the column through outlet 7.

Figure 4:
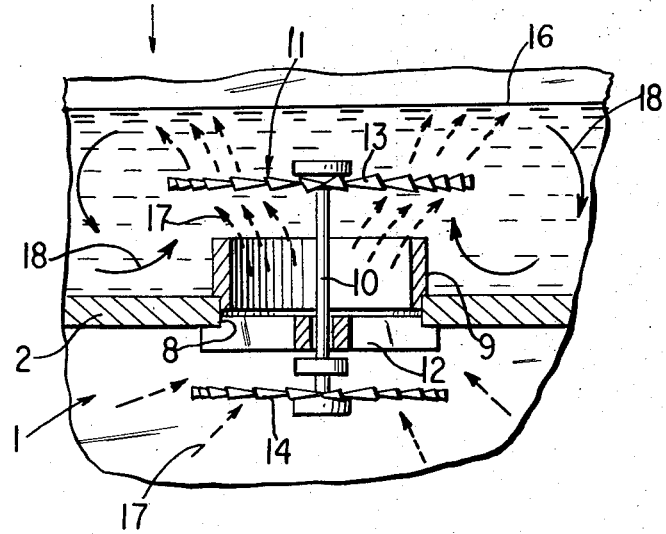
FIG. 4 is a view, partially in section, through the tray, showing the novel gas-dispersion components.

Details of the gas-dispersing assembly are illustrated in FIG. 4. Tray 2 supports a flowing stream of a liquid phase. The level of the stream is indicated by 16. An opening 8 is provided in tray 2. A short nipple or a piece of pipe 9 is disposed in the opening 8 and extends vertically to an elevation below liquid phase level 16. Bearing 12 is secured to the bottom of tray 2 concentrically with the nipple 9. Shaft 10 is journaled in the bearing 12 supporting disk 11 at one end and a fan wheel 14 at the other. Shaft 10 is journaled loosely in the bearing 12 to permit free rotation and vertical movement of disk 11 and fan wheel 14. Arrows 18 denote swirling of liquid phase on tray 2 in the vicinity of the gas-dispersing assembly 3 as it moves across to the downcomer. Arrows 17 show the direction of movement of the vapor phase.

Figure 5:
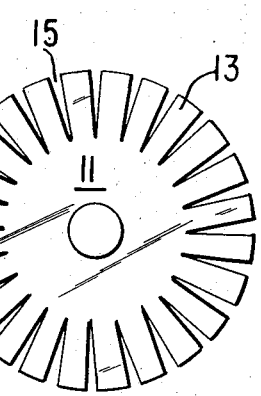
FIG. 5 is a plan view of the gas-dispersion disk.

The plan view of disk 11 is shown in FIG. 5. The disk consists of a flat circular sheet provided with a plurality of circumferentially arranged fan elements 13. Individual fan elements 13 are disposed at an angle to the plane of disk 11 thus creating spaces 15 through which vapors rise and come into contact with the liquid phase disposed on tray 2. As would be apparent to those skilled in the art, fan elements 13 can be cut from a larger circular stock and each element can then be deformed to provide spaces 15.

The function of the gas-dispersing assembly 3, shown in FIG. 4, is to being the gas or vapor phase into intimate contact with the liquid phase to thus effect a mass transfer of light components from the liquid phase to vapor phase and the heavier components from the vapor phase to the liquid phase. When no vapor is generated in column 1, or when insufficient vapor is generated, disk 11 rests on short nipple 9. The diameter of disk 11 is such that it completely covers short nipple 9 thus obstructing any flow of the vapor from the lower tray to the upper tray. The diameter of disk 11 can be somewhat smaller than the inside diameter of short nipple 9 to permit some flow of vapor to the upper tray when the disk is resting on the nipple. When sufficient vapor has been generated, and thereby sufficient pressure has been built up, the disk is lifted above the short nipple and the vapor enters through the nipple and is dispersed in the liquid phase, as shown by arrows 17. As is evident from FIG. 4, at least some of the vapor flows through spaces 15 and is thereby more efficiently dispersed, resulting in a higher mass-transfer efficiency.

Disk 11 and fan wheel 14 can be either loosely or rigidly mounted on shaft 10. It is preferred to mount them loosely to permit each to rotate on shaft 10 independently of each other. In this manner, rotation of disk 11 will be controlled by the currents in the liquid phase, while rotation of fan wheel 14 will be dictated by vapor currents above the lower tray.

Fan wheel 14 is constructed similarly to disk 11. A number of deformed fan elements are so arranged on the periphery of hub as to provide spaces similar to spaces 15 on the disk. Vapor from the lower tray flows through and around these spaces. Fan wheel 14 is provided for the purpose of reducing the carry over of entrained liquid particles to the upper tray since such carry over has a detrimental effect on the concentration balance of the components in the liquid and vapor phases. The fan wheel accomplishes this function by physically obstructing the passage of entrained liquid particles. These particles come in contact with the fan wheel and settle thereon. Depending on the particle composition, some of them are vaporized and flow upwardly while others coalesce with other particles to form drops of liquid which fall to the tray below.

Various modifications of the gas-dispersing assembly described above may be made without departing from the spirit or scope thereof, and it is to be understood that the invention is to be limited only as defined in the appended claims.

We claim:

1. In a liquid-gas contact plate column comprising a plurality of vertically spaced horizontal trays for retaining a body of descending liquid thereon, a plurality of uniformly spaced openings in said trays for allowing an ascending vapor phase to pass therethrough, a short cylindrical conduit disposed concentrically in association with each of said openings and extending above said tray to a height below the level of liquid on said tray, and vapor pressure-responsive self-adjusting valve means in association with each of said cylindrical conduits, said valve mean including a shaft disposed concentrically within said conduit and projecting from both ends thereof and freely mounted for rotation and axial movement in said conduit, the improvement which consists of a disk mounted on said shaft above said tray, the diameter of aid disk being at least as great as the inside diameter of said conduit, fan elements disposed on the periphery of said disk with spaces therebetween, the diametrical extent of said fan elements being at least as great as the outside diameter of said conduit, a fan wheel mounted on said shaft portion extending below said tray, and apertures in said fan wheel.

2. In a liquid-gas contact plate column according to claim 1, said fan wheel comprising fan elements arranged circumferentially thereon and spaces between said fan elements.

3. In a liquid-gas contact plate column according to claim 1, said disk and said fan wheel being rotatably mounted on said shaft.

* * * * *